United States Patent [19]

Jacobsson et al.

[11] Patent Number: 5,167,496

[45] Date of Patent: Dec. 1, 1992

[54] SCREW COMPRESSOR WITH FLUID BEARINGS

[75] Inventors: Bo O. Jacobsson, Zeist; Antonio Gabelli, Ijsselstein, both of Netherlands

[73] Assignee: SKF Industrial Trading & Development Company B.V., Nieuwegein, Netherlands

[21] Appl. No.: 785,861

[22] Filed: Oct. 28, 1991

Related U.S. Application Data

[63] Continuation of Ser. No. 455,076, Dec. 22, 1989, abandoned.

[30] Foreign Application Priority Data

Dec. 29, 1988 [NL] Netherlands .......................... 8803199

[51] Int. Cl.⁵ .............................................. F04C 18/16
[52] U.S. Cl. ................................... 418/102; 418/201.1; 384/118
[58] Field of Search ...................... 418/201 R, 98, 102; 384/118

[56] References Cited

U.S. PATENT DOCUMENTS

| | | | |
|---|---|---|---|
| 1,762,708 | 6/1930 | Allred | 418/201.1 |
| 2,672,282 | 3/1954 | Novas | 418/98 |
| 3,178,104 | 2/1965 | Williams et al. | 418/201.1 |
| 4,573,889 | 3/1986 | Lane | 418/102 |
| 4,637,787 | 1/1987 | Sagerström | 418/203 |
| 4,671,676 | 6/1987 | Chen et al. | 384/118 |
| 4,685,813 | 8/1987 | Moog | 384/118 |
| 4,710,035 | 12/1987 | Vaughn | 384/118 |

FOREIGN PATENT DOCUMENTS

| | | | |
|---|---|---|---|
| 121867 | 11/1930 | Austria | 418/102 |
| 548830 | 10/1956 | Italy | 418/102 |
| 58-8288 | 1/1983 | Japan | 418/98 |
| 294511 | 6/1963 | Netherlands | . |
| 326683 | 2/1958 | Switzerland | 418/102 |
| 1163326 | 9/1969 | United Kingdom | 384/118 |

*Primary Examiner*—John J. Vrablik
*Attorney, Agent, or Firm*—Eugene E. Renz, Jr.

[57] ABSTRACT

A screw compressor, having a housing with an inlet and an outlet opening in which two or more rotors are rotatably mounted on bearings. The bearings are equipped with helically meshing profiles which operate tightly in conjunction with a closely fitted cylindrical part of the housing. The bearing devices or the rotors consist at least in part of fluid bearings.

1 Claim, 1 Drawing Sheet

SCREW COMPRESSOR WITH FLUID BEARINGS

This is a continuation of copending application(s) Ser. No. 07/455,076 filed on Dec. 22, 1989, abandoned.

FIELD OF THE INVENTION

The invention concerns a screw compressor consisting of a housing with an inlet and an outlet opening in which two or more rotors rotatably mounted on bearings are equipped with helically meshing profiles which operate tightly in conjunction with a closely fitted cylindrical part of the housing.

BACKGROUND OF THE INVENTION

A similar screw compressor is generally known, e.g., from the British Pat. No. 1358505. In these known screw compressors the bearing devices for the rotors consist of lubricated roller bearings. In this context the properties of the lubricant are very important.

A problem with these known screw compressors is that the lubricant or the bearings is often contaminated by the medium to be compressed, causing the lubricating properties of the lubricant to deteriorate. This may result in an unacceptably short life of the bearings, the appearance of vibrations and of excessive noise of the compressor. When the compressor is applied in cooling systems, for example, a cold start of the compressor may suck in liquid coolant which may mix with or dissolve in the lubricant in the crankcase of the compressor. In other systems, too, similar problems may occur due to the effect of the medium to be compressed on the lubricant.

SUMMARY OF THE INVENTION

The invention aims at creating a screw compressor of the type mentioned above in which the aforementioned problems are avoided.

This objective is achieved according to the invention due to the fact that the bearing devices consist at least in part of fluid bearings.

In these bearings, which in themselves have been known in the trade for a long time, e.g., from the British Pat. No. 1,375,116, the bearing bushing is equipped with a number of pressure chambers distributed radially around the shaft and facing the shaft with their open sides. A pressure medium requiring no or limited lubrication properties is supplied by a pressure source under sufficiently high pressure via the pressure valve or throttle systems to the pressure chambers, causing the shaft — even when standing still — to be held in the center of the bearing bushing. Should the shaft be displaced radially to one side under the effect of a changing load, the pressure of the pressure medium in the pressure chamber or chambers on that side will rise because the gap heights between the shaft and the bushing will decrease. At the same time, the pressure of the pressure medium will decrease in the pressure chamber or chambers diametrically opposite because the flow of the pressure medium will be greater due to the increased gap heights between the shaft and the bushing. These changes in the pressure of the pressure medium on both sides of the shaft results in the fact that each movement of the axis from the normal central position is automatically countered, and the shaft is held in the central position.

Although the above description involves specifically a radial fluid bearing, the corresponding operation of an axial fluid bearing will be equally clear to one skilled in the art.

As a result of the use of fluid bearing devices as bearings for the rotors in the compressor housing, any contamination of the pressure medium for the bearings by the medium to be compressed will hardly affect the bearing unfavorably. If the pressure of the pressure medium is higher than the pressures occurring in the compressor housing, there won't be any contamination at all of the pressure medium by the medium to be compressed. In addition, there is evidence that a very stiff bearing of the rotors and a highly precise centering of the rotor shafts can be achieved, with a maximum deviation of the rotor shaft from the center of less than 0.3 um. This will result in less play between the rotors, and between the rotors and the cylindrical part of the compressor housing, so that, surprisingly, a higher compressor performance and a clearly lower noise level of the compressor are achieved.

According to the area of application of the screw compressor, part of all of the bearing devices may consist of fluid bearings.

A very simple system can be achieved according to the invention if the medium to be compressed is used as the pressure medium for the fluid bearings of the rotors.

According to a further elaboration of the invention, the working medium which serves as the pressure medium for the fluid bearings may be obtained directly by tapping the high-pressure side of the system.

This will render the application of a separate feed pump or compressor for the pressure medium superfluous, thus simplifying the system even further.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
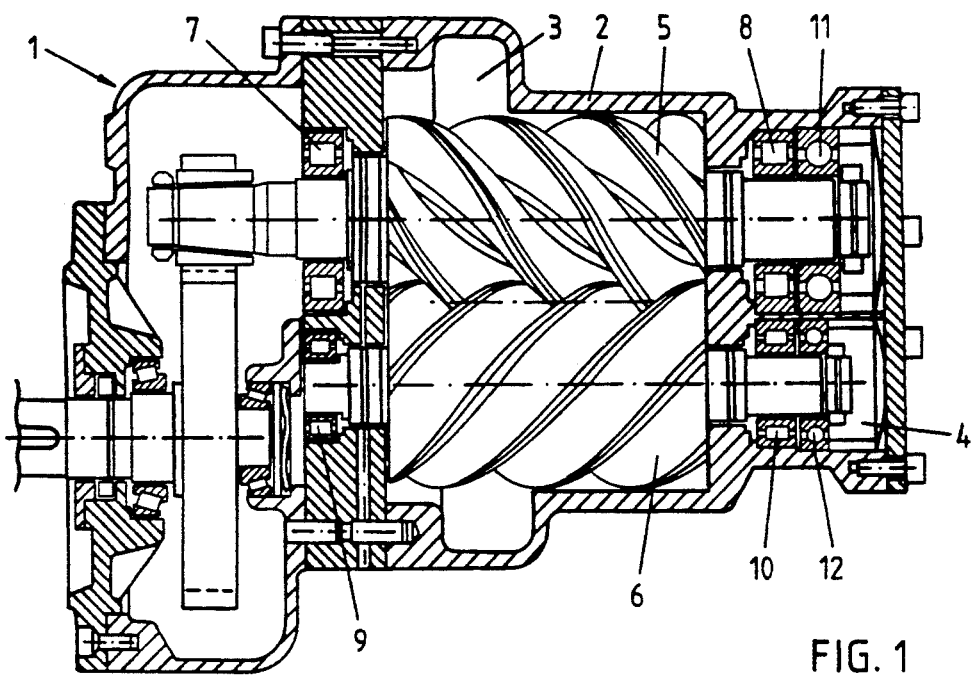
FIG. 1 shows a cross-section of both rotor shafts of an example of the known screw compressor.

As shown in FIG. 1 the known screw compressor includes a housing 1 equipped with a cylindrical part 2 fitted closely around the rotors 5, 6, an inlet opening 3 and an outlet opening 4. Both rotors 5, 6 are rotatably mounted on bearings in the housing by means of single-row cylinder bearings 7, 8, respectively 9, 10, while the axial load on the rotors is taken up by the corner contact ball bearings 11 and 12.

Figure 2:
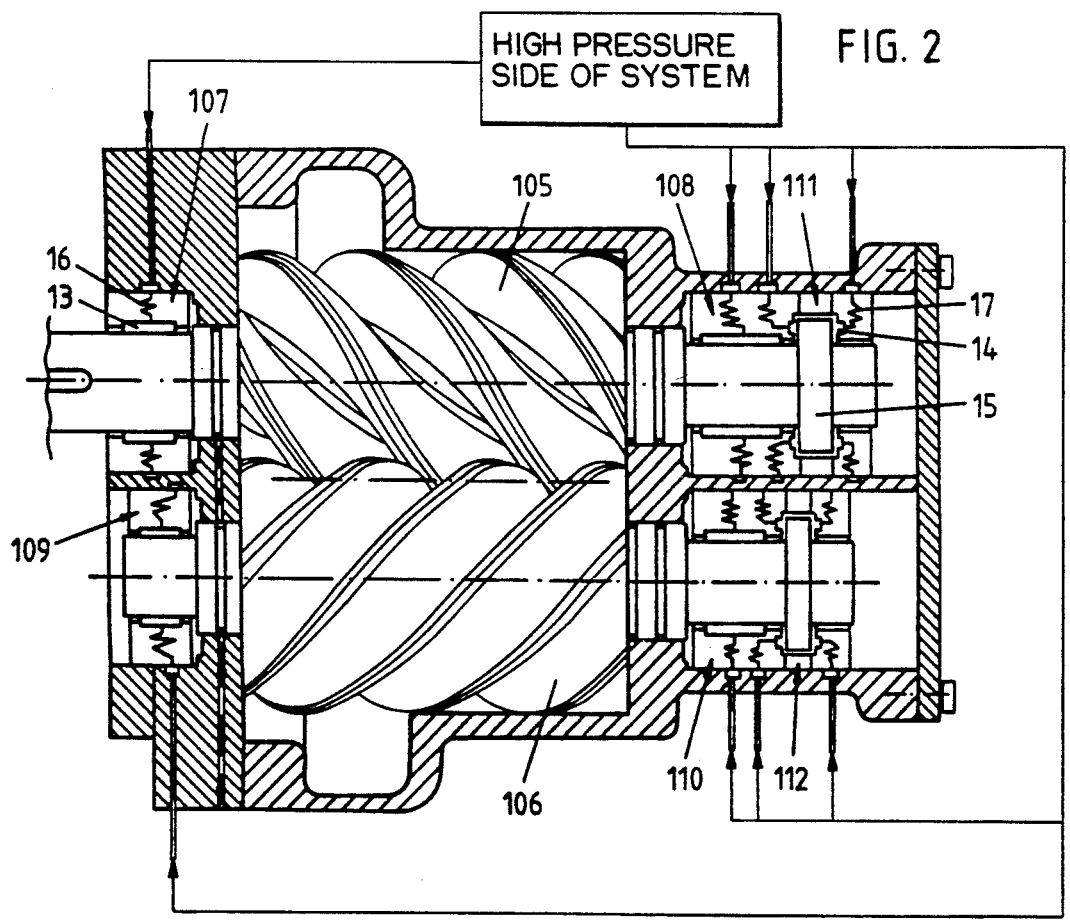
FIG. 2 shows a cross-section of both rotor shafts of an example of execution of a screw compressor according to the invention, including a schematic rendering of the fluid bearing devices.

FIG. 2 shows the parts of the example of execution corresponding to the parts in FIG. 1; they are marked with reference numbers increased by 100. As this figure shows, both 105, 106 of the screw compressor are rotatably mounted with radial fluid bearings 107, 108, respectively 109, 110, while the axial load on the rotors is taken up by axial fluid bearings 111 and 112 which, in this example of execution, are executed as double film bearings.

In principle, the fluid bearings consist of a number of pressure chambers 13, 14 which in radial bearings are distributed radially around the shaft to be borne, and which in axial bearings may be located on both sides of a collar 15. The arrows in FIG. 2 indicate the supply of the pressure medium via the pressure valves or throttles 16, 17 from a feed pump, compressor or other pressure source not shown in the figure. This leads to a build up of pressure on both sides of the shaft or of the shaft collar, causing the load to be carried and the shaft to be centered.

It will be clear that the invention is not limited to the example of execution described above, but that the concept of the invention can be constructively embodied in many ways.

What is claimed is:

1. Screw compressor for compressing a working fluid medium having a high pressure side, comprising a housing having inlet and outlet openings, rotors having helically meshing profiles rotatably mounted by shaft members in said housing on bearings, said bearings consisting of fluid bearings including a plurality of pressure chambers (13) distributed radially around the shaft members, a radially extending collar on at least one said shaft members having pressure chambers (14) on axial end faces of said collar, and line means connecting the high-pressure side of the screw compressor to the pressure chambers for transmitting the working fluid medium to the fluid bearings, and throttle means (16, 17) in said lines to produce pressure build up on both sides of said shaft member, to support load and center the shaft, whereby the working medium to be compressed is used as the pressure medium for the hydrostatic bearings.

* * * * *